United States Patent
Kuang et al.

(10) Patent No.: US 12,491,658 B1
(45) Date of Patent: *Dec. 9, 2025

(54) WOOD PRESERVATIVE COMPOSITION COMPRISING 4,5-DICHLORO-2-OCTYLISOTHIAZOL-3(2H)-ONE, A METHOD TREATING A WOOD SUBSTRATE THEREWITH, AND A WOOD PRODUCT PRODUCED THEREFROM

(71) Applicant: KOPPERS PERFORMANCE CHEMICALS, INC., Pittsburgh, PA (US)

(72) Inventors: Min Kuang, Peachtree City, GA (US); Jun Zhang, Peachtree City, GA (US)

(73) Assignee: KOPPERS PERFORMANCE CHEMICALS, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/294,981

(22) Filed: Aug. 8, 2025

Related U.S. Application Data

(63) Continuation of application No. 18/294,852, filed as application No. PCT/US2022/074619 on Aug. 5, 2022.

(60) Provisional application No. 63/229,817, filed on Aug. 5, 2021.

(51) Int. Cl.
| | |
|---|---|
| *B27K 3/34* | (2006.01) |
| *A01N 43/80* | (2006.01) |
| *B27K 3/40* | (2006.01) |
| *C09D 5/14* | (2006.01) |
| *C09D 125/14* | (2006.01) |
| *C09D 167/08* | (2006.01) |
| *C09D 191/08* | (2006.01) |

(52) U.S. Cl.
CPC ............. *B27K 3/343* (2013.01); *A01N 43/80* (2013.01); *B27K 3/40* (2013.01); *C09D 5/14* (2013.01); *C09D 125/14* (2013.01); *C09D 167/08* (2013.01); *C09D 191/08* (2013.01); *B27K 2200/10* (2013.01); *B27K 2200/30* (2013.01); *B27K 2240/20* (2013.01); *B27K 2240/50* (2013.01)

(58) Field of Classification Search
CPC .......... A01N 43/80; B27K 3/343; B27K 3/40; B27K 2200/10; B27K 2200/30; B27K 2240/20; B27K 2240/50; C09D 5/14; C09D 125/14; C09D 167/08; C09D 191/08
See application file for complete search history.

(56) References Cited

U.S. PATENT DOCUMENTS

| | | | | |
|---|---|---|---|---|
| 7,297,193 B1 * | 11/2007 | Ashmore | ............... | B27K 3/007 106/272 |
| 2015/0132492 A1 * | 5/2015 | Ashmore | ............... | B27K 3/343 514/372 |
| 2016/0185008 A1 * | 6/2016 | Ashmore | ............... | B27K 3/343 428/323 |

* cited by examiner

*Primary Examiner* — Anthony J Green
(74) *Attorney, Agent, or Firm* — K&L Gates LLP

(57) ABSTRACT

A wood preservative composition comprising 4,5-dichloro-2-octylisothiazol-3(2H)-one, a method of treating a wood substrate therewith, and a wood product produced therefrom are provided. The wood preservative composition comprises at least 0.5% by weight of DCOI based on the total weight of the composition and a retaining additive comprising a solvent-borne polymeric resin, N a wax, or a combination thereof. A weight ratio of the DCOI to the retaining additive in the composition is in a range of 1:5 to 5:1.

20 Claims, No Drawings

WOOD PRESERVATIVE COMPOSITION COMPRISING 4,5-DICHLORO-2-OCTYLISOTHIAZOL-3(2H)-ONE, A METHOD TREATING A WOOD SUBSTRATE THEREWITH, AND A WOOD PRODUCT PRODUCED THEREFROM

CROSS-REFERENCE

The present application is continuation of U.S. patent application Ser. No. 18/294,852, filed on Feb. 2, 2024, which is a U.S. national stage application, filed under 35 U.S.C. § 371, of International Application No. PCT/US2022/074619, which was filed on Aug. 5, 2022, and which claims priority to U.S. Provisional Application No. 63/229,817, filed Aug. 5, 2021. The entire contents of each are hereby incorporated by reference into this specification.

FIELD

The present disclosure relates to a wood preservative composition comprising 4,5-dichloro-2-octylisothiazol-3(2H)-one, a method of treating a wood substrate therewith, and a wood product produced therefrom.

BACKGROUND

Oil-borne preservatives, such as, for example, pentachlorophenol (Penta) in hydrocarbon solvent carriers have been used as heavy-duty industrial wood preservative to treat, for example, utility poles for many decades. Oil-borne preservatives comprising Penta may impart treated wood with excellent resistance to wood decay fungi and termites as well as potentially desirable climbability, electrical resistance, and inhibition of corrosion of hardware. However, in 2015, the Stockholm Convention classified Penta as a persistent organic pollutant (POP) and proposed to discontinue its use. In 2019, the only North American producer of Penta made an announcement that they will close its manufacturing plant and a blending facility at the end of 2021. In March 2021, the EPA made a proposal to cancel all uses of pentachlorophenol through the Federal Insecticide, Fungicide and Rodenticide Act (FIFRA) registration review process. Therefore, an alternative oil-borne preservative to oil-borne preservatives comprising Penta is desired.

SUMMARY

The present disclosure provides a wood preservative composition comprising at least 0.5% by weight of 4,5-dichloro-2-octylisothiazol-3-one (DCOI) based on the total weight of the composition and a retaining additive comprising a solvent-borne polymeric resin, a wax, or a combination thereof. A weight ratio of the DCOI to the retaining additive in the composition is in a range of 1:5 to 5:1.

The present disclosure also provides a method of treating a wood substrate. The method comprises contacting the wood substrate with a wood preservative composition for a period of time suitable to inhibit fungal decay of the wood substrate. The wood preservative composition comprises at least 0.5% by weight of 4,5-dichloro-2-octylisothiazol-3-one (DCOI) based on the total weight of the composition and a retaining additive comprising a solvent-borne polymeric resin, a wax, or a combination thereof. A weight ratio of the DCOI to the retaining additive in the composition is in a range of 1:5 to 5:1.

The present disclosure also provides a wood product produced by treating a wood substrate with a wood preservative composition. The wood preservative composition comprises at least 0.5% by weight of 4,5-dichloro-2-octylisothiazol-3-one (DCOI) based on the total weight of the composition and a retaining additive comprising a solvent-borne polymeric resin, a wax, or a combination thereof. A weight ratio of the DCOI to the retaining additive in the composition is in a range of 1:5 to 5:1.

The present disclosure also provides a wood product comprising a wood preservative composition. The wood preservative composition comprises at least 0.5% by weight of 4,5-dichloro-2-octylisothiazol-3-one (DCOI) based on the total weight of the composition and a retaining additive comprising a solvent-borne polymeric resin, a wax, or a combination thereof. A weight ratio of the DCOI to the retaining additive in the composition is in a range of 1:5 to 5:1.

It is understood that the inventions described in this specification are not limited to the examples summarized in this Summary. Various other aspects are described and exemplified herein.

DETAILED DESCRIPTION

Certain exemplary aspects of the present disclosure will now be described to provide an overall understanding of the principles of the structure, function, manufacture, and use of the compositions, methods, and products disclosed herein. One or more examples of these aspects are illustrated in the accompanying drawings. Those of ordinary skill in the art will understand that the devices and methods specifically described herein and illustrated in the accompanying drawings are non-limiting exemplary aspects and that the scope of the various examples of the present disclosure is defined solely by the claims. The features illustrated or described in connection with one exemplary aspect may be combined with the features of other aspects. Such modifications and variations are intended to be included within the scope of the present disclosure.

Any references herein to "various examples," "some examples," "one example," "an example," similar references to "aspects," or the like, means that a particular feature, structure, or characteristic described in connection with the example is included in at least one example. Thus, appearances of the phrases "in various examples," "in some examples," "in one example," "in an example," similar references to "aspects," or the like, in places throughout the specification are not necessarily all referring to the same example. Furthermore, the particular features, structures, or characteristics may be combined in any suitable manner in one or more examples. Thus, the particular features, structures, or characteristics illustrated or described in connection with one example may be combined, in whole or in part, with the features, structures, or characteristics of one or more other examples without limitation. Such modifications and variations are intended to be included within the scope of the present examples.

4,5-dichloro-2-octylisothiazol-3(2H)-one (DCOI) has been used in wood preservative compositions for mold control and antibacterial activity. DCOI dissolved in hydrocarbon solvents has also been proposed to treat wood for heavy duty applications. The present disclosure provides a wood preservative composition comprising DCOI, an organic solvent, and a retaining additive that the present inventors surprisingly discovered that can enhance resistance to fungal and/or insect attack.

DCOI ($C_{10}H_{15}Cl_2NOS$) is an organic compound biocide that can inhibit fungal decay and/or insect attack of a wood product. Thus, the concentration of the DCOI in the wood preservative composition according to the present disclosure can be selected based on the desired level of inhibition of the fungal decay and/or insect attack, and/or based on the method used to treat the wood product. For example, the wood preservation composition according to the present disclosure can comprise a concentration of DCOI of at least 0.5% by weight based on the total weight of the composition, such as, for example, at least 1.0% by weight, at least 2.0% by weight, at least 2.5% by weight, or at least 3.0% by weight, all based on the total weight of the composition. The wood preservation composition according to the present disclosure can comprise a concentration of DCOI no greater than 10% by weight based on the total weight of the composition, such as, for example, no greater than 9% by weight, no greater than 8% by weight, no greater than 5% by weight, no greater than 4% by weight, or no greater than 3% by weight, all based on the total weight of the composition. In various examples, the wood preservative composition according to the present disclosure can comprise a concentration of DCOI in a range of 0.5% by weight to 10% by weight based on the total weight of the composition, such as, for example, 1.0% by weight to 5.0% by weight, 1.5% by weight to 5.0% by weight, 1.5% by weight to 3.0% by weight, 2.0% by weight to 3.0% by weight, 2.0% by weight to 2.5% by weight, 1.5% by weight to 2.0% by weight, all based on the total weight of the composition. For example, the wood preservation composition according to the present disclosure can comprise 2% by weight DCOI based on the total weight of the composition.

The organic solvent can facilitate solubilization of the DCOI and/or the retaining additive and/or the penetration of the DCOI into a wood product. For example, DCOI can comprise a solubility of 2% in the organic solvent, such as, for example, at least 5% in the organic solvent. The organic solvent can comprise one solvent, or a mixture of two or more solvents based on the application and/or desired properties of the organic solvent. The organic solvent can comprise a hydrocarbon solvent (e.g., diesel #2, diesel #4, diesel #6, an aliphatic solvent), an amine solvent, a glycol solvent, a ketone solvent, an ester solvent, an alcohol solvent, a halogenated solvent, a terpene solvent, an aromatic solvent, a biodegradable organic solvent, or a combination thereof.

When employed in wood preservative composition according to the present disclosure the hydrocarbon solvent can comprise various hydrocarbon classes and chain lengths. For example, the hydrocarbon solvent can be a hydrocarbon solvent as defined in American Wood Protection Association (AWPA) 2021 Book of Standards HSA-18, HSC-17, HSF-17, HSG-18, HSH-18, or a combination thereof. The chain length and hydrocarbon classes of the hydrocarbon solvents suitable for use with the present disclosure can be selected to achieve a desired flash point of the composition and/or solubility of the DCOI and/or retaining additive. For example, the organic solvent can comprise a hydrocarbon solvent, such as, for example, diesel. The organic solvent can comprise a flash point of at least 20 degrees Celsius, such as, for example, at least 50 degrees Celsius or at least 60 degrees Celsius, at least 70 degrees Celsius, at least 80 degrees Celsius, at least 90 degrees Celsius, at least 100 degrees Celsius, at least 110 degrees Celsius, at least 120 degrees Celsius, at least 150 degrees Celsius, or at least 200 degrees Celsius. The hydrocarbon solvent can be derived from petroleum based products.

The aliphatic solvent can comprise, Heptane, Hexane, Kerosene, Lacquer Diluent, Mineral Seal Oil, #2 fuel oil, Mineral Spirits, n-Pentane, OMS-Odorless Mineral Spirits, Rubber Solvent, 140 Solvent, 360 Solvent, Textile Spirits.RTM., VM&P, or a combination thereof.

The amine solvent can comprise Diamylamine, Diethylamine, Diisopropylamine, Dimethylethylamine, Di-n-Butylamine, Mono-2-Ethylhexyamine, Monoamylamine, Monoethylamine 70%, Monoisopropylamine, Anhy., Mono-n-Butylamine, Triamylamine, Triethylamine, Tri-n-Butylamine, Dibutylaminoethanol, Diethylaminoethanol, Diethylaminoethoxyethanol, Diisopropylaminoethanol, Dimethylamino-2P, 77% Mixed, Dimethylamino-2-P, Anhy., Dimethylaminoethanol, Dimethylaminoethoxyethanol, Ethylaminoethanol, Ethylaminoethanol, Mixed, Isopropylaminoethanol, Isopropylaminoethanol, Mixed, Methyldiethanolamine, Monomethylaminoethanol, Mono-n-Propylaminoethanol, n-Butylaminoethanol, n-Butyldiethanolamine, n-Butyldiethanolamine, Photo, t-Butylaminoethanol, t-butyldiethanolamine, Diethanolamine, Monoethanolamine, Triethanolamine, Triethanolamine 85%/99%, Diisopropanolamine, Monoisopropanolamine, Triisopropanolamine, Aminoethylethanolamine, Aminoethylpiperazine, Diethylenetriamine, Ethylenediamine, Piperazine 65%/Anhy., Piperazine, Tetraethylenepentamine, Triethylenetetramine, 3-Methoxypropylamine, AMP.RTM. Regular/95, Cyclohexylamine, Morpholine, Neutrol TE.RTM, or a combinations thereof.

The glycol solvent can comprise Diethylene Glycol, Dipropylene Glycol, Ethylene Glycol, Glycerine 96%, 99%, U.S.P., Glycerine, Hexylene Glycol, Neol.RTM. Neopentyiglycol, Polyethylene Glycol, Polypropylene Glycol, Propylene Glycol Ind., U.S.P., Tetraethylene Glycol, Triethylene Glycol, Tripropylene Glycol, or a combination thereof.

The ketone solvent can comprise Acetone, Cyclohexanone, Diacetone, DIBK-Diisobutyl Ketone, Isophorone, MAK-Methyl Amyl Ketone, MEK--Methyl Ethyl Ketone, MIAK-Methyl Isoamyl Ketone, MIBK-Methyl Isobutyl Ketone, MPK-Methyl Propyl Ketone, or a combination thereof.

The ester solvent can comprise Amyl Acetate, Dibasic Ester, Ethyl Acetate, 2 Ethyl Hexyl Acetate, Ethyl Propionate, Exxate.RTM. Acetate Esters, Isobutyl Acetate, Isobutyl Isobuterate, Isopropyl Acetate, n-Butyl Acetate, n-Butyl Propionate, n-Pentyl Propionate, n-Propyl Acetate, or a combination thereof.

The alcohol solvent can comprise Amyl Alcohol, Benzyl Alcohol, Cyclohexanol, Ethyl Alcohol-Denatured, 2-Ethyl Hexanol, Exxal 8.RTM. Isooctyl Alcohol, Exxal 10.RTM. Isodecyl Alcohol, Exxal 13.RTM. Tridecyl Alcohol, Furfuryl Alcohol, Isobutyl Alcohol, Isopropyl Alcohol 99% Anhy, Methanol, Methyl Amyl Alcohol (MIBC), n-Butyl Alcohol, n-Propyl Alcohol, Neodol.RTM. Linear Alcohol, Secondary Butyl Alcohol, Tertiary Butyl Alcohol, Tetrahydrofurfuryl Alcohol, Texanol Ester Alcohol.RTM., UCAR Filmer IBT.RTM, or a combination thereof.

The halogenated solvent can comprise Methylene Chloride, Monochlorobenzene, Orthodichlorobenzene, Perchloroethylene, Trichloroethylene, Vertrel.RTM. Hydrofluorocarbon, or a combination thereof.

The terpene solvent can comprise Alpha-Pinene, Wood, Dipentene 122.RTM., D-Limonene, Herco.RTM. Pine Oil, Solvenol.RTM., Steam Distilled Turpentine, Terpineol.RTM., Yarmor.RTM. 302,302-W Pine Oil, or a combination thereof.

The aromatic solvent can comprise Aromatic 100, Aromatic 150, Aromatic 200, Aromatic 200ND, Heavy Aromatic Solvent, Panasol.RTM., Toluene, Xylene, or a combination thereof.

The biodegradable organic solvent can comprise vegetable oil (e.g., renewable resource oil), biodiesel, or a combination thereof. Vegetable oil refers to compounds extracted from plants. For example, the compounds extracted from plants are primarily triglyceride-based, and present as liquid, fatty waxy, or solid state at room temperature. Vegetable oils that are waxy or solid at room temperature are also called vegetable fats. In Addition, vegetable oil contains both saturated and unsaturated carbon-carbon double bonds.

Unsaturated vegetable oils can be transformed through partial or complete hydrogenation into oils of higher melting point. The hydrogenation process involves sparging the oil at a high temperature and a high pressure with hydrogen in the presence of a catalyst, typically a nickel based compound. As each carbon-carbon double-bond is chemically reduced to a single bond, two hydrogen atoms each form single bonds with the two carbon atoms to increase its degree of saturation. An oil may be hydrogenated to increase resistance to rancidity (oxidation) or to change its physical characteristics. As the degree of saturation increases, the oil's viscosity and melting point increase.

The vegetable oil can comprise linseed oil, coconut oil, corn oil, cottonseed oil, palm oil, canola oil, palm kernel oil, olive oil, peanut oil, rapeseed oil, safflower oil, sesame oil, soybean oil, sunflower oil, castor oil, tung oil, poppyseed oil, vernonia oil, almond oil, beech nut oil, Brazil nut oil, virgin oil, cashew oil, hazelnut oil, macadamia oil, mongongo nut oil (manketti oil), pecan oil, pine nut oil, pistachio oil, walnut oil, pumpkin seed oil, pracaxi oil, grape seed oil, rice bran oil, carapa oil, hempseed oil, or a combination thereof.

Renewable resource oil is derived from sustainable and renewable sources of fatty acids and resins, such as tall oil. Tall oil, also called "liquid rosin" or tallol, is a yellow-black liquid obtained as a by-product of wood pulping process. Tall oil is the third largest chemical by-product in a Kraft mill after lignin and hemicellulose; the yield of crude tall oil from the process is in the range of 30-50 kg/ton pulp, and it has been produced commercially since the 1930s. Biodiesel refers to a vegetable oil- or animal fat-based diesel fuel comprising long-chain alkyl (methyl, ethyl, or propyl) esters. Biodiesel is typically made by chemically reacting lipids (e.g., vegetable oil, soybean oil,[1] animal fat (tallow [2][3])) with an alcohol producing fatty acid esters.

The organic solvent can comprise a flash point of at least 20 degrees Celsius, such as, for example, at least 30 degrees Celsius, at least 40 degrees Celsius, at least 50 degrees Celsius, at least 60 degrees Celsius, at least 70 degrees Celsius, at least 80 degrees Celsius, at least 100 degrees Celsius, at least 150 degrees Celsius, or at least 200 degrees Celsius.

The wood preservative composition can comprise a concentration of the organic solvent of at least 50% by weight based on the total weight of the composition, such as, for example, at least 60% by weight, at least 70% by weight, at least 80% by weight, or at least 90% by weight, all based on the total weight of the composition. The wood preservative composition can comprise a concentration of organic solvent in a range of 50% by weight to 99% by weight based on the total weight of the composition, such as, for example, 50% by weight to 98% by weight, 60% by weight to 98% by weight, 70% by weight to 98% by weight, or 80% by weight to 96% by weight, all based on the total weight of the composition. The organic solvent can be polar, non-polar, a combination of polar and non-polar solvents.

The retaining additive comprises a solvent-borne polymeric resin, a wax, or a combination thereof. Without being bound to any particular theory, the retaining additive can bind the DCOI to the wood product, entrap the DCOI within the wood, physically fix the DCOI to the wood product, and/or otherwise inhibit movement of the DCOI in the wood product (e.g., from inside of the wood product to a surface of the wood product). The concentration of the retaining additive in the wood preservative composition can be balanced with the concentration of the DCOI used in the wood preservative composition according to the present disclosure to achieve a desired retention of the DCOI in a wood product treated with the wood preservative composition according to the present disclosure. For example, a weight ratio of the DCOI to the retaining additive can be in a range of 1:5 to 5:1, such as, for example, 1:4 to 4:1, 1:3 to 3:1, 1:2 to 2:1, 1.5:1 to 1:1.5, or 1.1:1 to 1:1.1. In various examples, a weight ratio of the DCOI to the retaining additive can be 1:1.

The wood preservation composition according to the present disclosure can comprise a concentration of the retaining additive of at least 0.05% by weight based on the total weight of the composition, such as, for example, at least 0.2% by weight, at least 0.5% by weight, at least 1.0% by weight, at least 1.2% by weight, at least 1.5% by weight, at least 2% by weight, at least 3% by weight, or at least 4% by weight, all based on the total weight of the composition. The wood preservation composition according to the present disclosure can comprise a concentration of the retaining additive of no greater than 20% by weight based on the total weight of the composition, such as, for example, no greater than 15% by weight, no greater than 10% by weight, no greater than 9% by weight, no greater than 8% by weight, no greater than 5% by weight, no greater than 4% by weight, no greater than 3% by weight, or no greater than 2.5% by weight, all based on the total weight of the composition. For example, the wood preservative composition can comprises a concentration of the retaining additive in a range of 0.05% by weight to 20% by weight based on the total weight of the composition, such as, for example, 0.2% by weight to 20% by weight, 0.5% by weight to 20% by weight, 1% by weight to 15% by weight, 1% by weight to 10% by weight, 1% by weight to 5% by weight, 1.5% by weight to 10% by weight, 2% by weight to 5% by weight, 1.5% by weight to 3% by weight, or 1.5% by weight to 2.5% by weight, all based on the total weight of the composition. For example, the wood preservative composition according to the present disclosure can comprise 2.5% by weight of the retaining additive based on the total weight of the composition.

The solvent borne polymeric resin can comprise an epoxy, an acrylic, an acrylate, a polyurethane, a polyurea resin, a vinyl resin, a cellulose resin, a polyester resin, a polyether resin, a phenolic resin, an alkyd resin (e.g., short oil alkyd, long chain alkyd resin), a hydrocarbon resin, or a combination thereof. For example, the solvent borne polymeric resin can comprise a hydrocarbon resin, an alkyd resin, or a combination thereof. The solvent borne polymeric resin can comprise an alkyd resin (e.g., a long chain alkyd resin, such as, for example, a polymeric resin based on linseed oil). The solvent borne polymeric resin can comprise a long chain alkyd resin and the organic solvent is non-polar character (e.g., odorless mineral spirits). The long chain alkyd resin can comprise greater than 55% oil length.

The wax can comprise a paraffin wax, an olefin wax, a petroleum wax, a carnauba wax, a polyethylene wax, a slack wax, a silicone wax, a polypropylene wax, a polytetrafluoroethylene (PTFE) synthetic wax, or a combination thereof.

The wax can comprise a melting point suitable for handling and/or for a desirable treatment application. For example, the wax can comprise a melting point of at least 30 degrees Celsius, such as, for example, at least 35 degrees Celsius, at least 40 degrees Celsius, at least 45 degrees Celsius, at least 50 degrees Celsius, at least 55 degrees Celsius, at least 60 degrees Celsius, or at least 75 degrees Celsius. The wax can comprise a melting point of no greater than 100 degrees Celsius, such as, for example, no greater than 90 degrees Celsius, no greater than 80 degrees Celsius, no greater than 70 degrees Celsius, or no greater than 60 degrees Celsius. For example, the wax can comprise a melting point in a range of 30 degrees Celsius to 100 degrees Celsius, such as, for example, 35 degrees Celsius to 70 degrees Celsius.

The retaining additive can have a solubility in the organic solvent of at least 0.5% by weight, such as, for example, at least 1% by weight, at least 1.5% by weight, or at least 2% by weight.

Water may be present in the wood preservative composition according to the present disclosure, which can lead to the formation of stable emulsions that can affect the treatment of a wood product. The wood preservative composition according to the present disclosure can be formulated to inhibit emulsion formation and/or can comprise a de-emulsifier. The de-emulsifier can comprise an alkylphenol formaldehyde resin alkoxylate (AFRA), a polyalkylene glycol (PAG), an organic sulfonate, or a combination thereof. For example, the de-emulsifier can comprise a Stepan series de-emulsifiers (e.g., Agent NE-3A, NE-3B, Toximul 8244); Dow Chemicals DM series de-emulsifiers (e.g., DM3, DM5, DM6); Munzing Foamban series de-emulsifiers (e.g., 1550, TK-150, TK-75, WP-35); Evonik Tego Foamex series de-emulsifiers (e.g., 843, 844, 883, Surfynol 420); Demtrol series de-emulsifiers (e.g., 1030, 1040, 1130, 1135E, 2030, 2045, 4026, 6055, 6237); Reziflow series de-emulsifiers (e.g., 2110,2215, 2130,2140, 2205, 2210, 2300, 2305, 2600, 2605, 2720, 2740); or a combination thereof.

The wood preservative composition may not phase separate when stored at ambient temperature (i.e., a temperature in a range of 20 degrees Celsius to 24 degrees Celsius) for at least 60 minutes, such as, for example, at least 120 minutes, at least 240 minutes, 24 hours, 48 hours, or 72 hours.

The wood preservative composition according to the present disclosure can also optionally comprise a colorant, an ultraviolet (UV) stabilizer, a UV absorber, de-foamer, a water repellent, an additional biocide, a fungicide, a termiticide, a fire retardant, or a combination thereof. The UV stabilizer can comprise copper oxide, a copper salt, iron oxide, iron complexes, transparent iron oxide, iron salts, nanoparticle iron oxide, titanium dioxide, benzophenone, substituted benzophenones, cinnamic acid, esters of cinnamic acid, amides of cinnamic acid, substituted triazines (e.g., triphenyl triazaine, substituted phenyl triazine), or combinations thereof. The UV absorber can comprise benzotriazole, substituted benzotriazole, hindered amine light stabilizers, or combinations thereof. The water repellent can comprise a wax water repellent (e.g., paraffin wax, polyethylene wax, carnauba wax, slack wax), a silicone, or combinations thereof.

The fire retardant can be one or more compounds selected from the group consisting of inorganic metal oxides, hydroxides, salts and expandable graphite phosphate compounds, nitrogen-containing compounds, dipentaerythritol, pentaerythritol, dextrin and boron-containing compounds.

The additional biocide can comprise a creosote, a triazole, an imidazole, a pyrazole, a boron compound, a quaternary ammonium, an isothiazolone, a pyrethroid, copper metal, a copper compound (e.g., copper napthenate), pentachlorophenol, bethoxazin, or a combination thereof.

Triazole and imidazole can comprise: 1-[[2-(2,4-dichlorophenyl)-1,3-dioxolan-2-yl]methyl]-1H-1,2,4-triazole (azaconazole), 1-[(2RS,4RS:2RS,4SR)-4-bromo-2-(2,4-dichlorophenyl)tetrahydrofurfuryl]-1H-1,2,4-triazole (bromuconazole), (2RS,3RS; 2RS,3SR)-2-(4-chlorophenyl)-3-cyclopropyl-1-(1H-1,2,4-triazol-1-yl)butan-2-ol (Cyproconazole), (2RS,3RS)-1-(2,4-dichlorophenyl)-4,4-dimethyl-2-(1H-1,2,4-triazol-1-yl)pentan-3-ol (diclobutrazol), cis-trans-3-chloro-4-[4-methyl-2-(1H-1,2,4-triazol-1-ylmethyl)-1,3-dioxolan-2-yl]phenyl 4-chlorophenyl ether (difenoconazole), (E)-(RS)-1-(2,4-dichiorophenyl)-4,4-dimethyl-2-(1H-1,2,4-triazol-1-yl)pent-1-en-3-ol (diniconazole), (E)-(R)-1-(2,4-dichlorophenyl)-4,4-dimethyl-2-(1H-1,2,4-triazol-1-yl)pent-1-en-3-ol (diniconazole-M), (2RS,3SR)-1-[3-(2-chlorophenyl)-2,3-epoxy-2-(4-fluorophenyl)propyl]-1H-1,2,4-triazole (epoxiconazole), (RS)-1-[2-(2,4-dichlorophenyl)-4-ethyl-1,3-dioxolan-2-ylmethyl]-1H-1,2,4-triazole (etaconazole), (RS)-4-(4-chlorophenyl)-2-phenyl-2-(1H-1,2,4-triazol-1-ylmethyl)butyronitrile (fenbuconazole), 3-(2,4-dichlorophenyl)-6-fluoro-2-(1H-1,2,4-triazol-1-yl)quinazolin-4(3H)-one (fluquinconazole), bis(4-fluorophenyl)(methyl)(1H-1,2,4-triazol-1-ylmethyl)silane (flusilazole), (RS)-2,4'-difluoro-a-(1H-1,2,4-triazol-1-ylmethyl)benzhydryl alcohol (flutriafol), (2RS,5RS; 2RS,5SR)-5-(2,4-dichlorophenyl)tetrahydro-5-(1H-1,2,4-triazol-1-ylmethyl)-2-furyl 2,2,2-trifluoroethyl ether (furconazole), (2RS,5RS)-5-(2,4-dichlorophenyl)tetrahydro-5-(1H-1,2,4-triazol-1-ylmethyl)-2-furyl 2,2,2-trifluoroethyl ether (furconazole-cis), (RS)-2-(2,4-dichlorophenyl)-1-(1H-1,2,4-triazol-1-yl)hexan-2-ol (hexaconazole), 4-chlorobenzyl (EZ)-N-(2,4-dichlorophenyl)-2-(1H-1,2,4-triazol-1-yl)thioacetamidate (imibenconazole), (1RS,2SR,5RS; 1RS,2SR,5SR)-2-(4-chlorobenzyl)-5-isopropyl-1-(1H-1,2,4-triazol-1-ylmethyl)cyclopentanol (ipconazole), (1RS,5RS; 1RS,5SR)-5-(4-chlorobenzyl)-2,2-dimethyl-1-(1H-1,2,4-triazol-1-ylmethyl)cyclopentanol (metconazole), (RS)-2-(4-chlorophenyl)-2-(1H-1,2,4-triazol-1-ylmethyl)hexanenitrile (myclobutanil), (RS)-1-(2,4-dichloro-p-propylphenethyl)-1H-1,2,4-triazole(penconazole), cis-trans-1-[2-(2,4-dichlorophenyl)-4-propyl-1,3-dioxolan-2-ylmethyl]-1H-1,2,4-triazole (propiconazole), (RS)-2-[2-(1-chlorocyclopropyl)-3-(2-chlorophenyl)-2-hydroxypropyl]-2,4-dihydro-1,2,4-triazole-3-thione (prothioconazole), 3-(2,4-dichlorophenyl)-2-(1H-1,2,4-triazol-1-yl)-quinazolin-4(3H)-one (quinconazole), (RS)-2-(4-fluorophenyl)-1-(1H-1,2,4-triazol-1-yl)-3-(trimethylsilyl)propan-2-ol (simeconazole), (RS)-1-p-chlorophenyl-4,4-dimethyl-3-(1H-1,2,4-triazol-1-ylmethyl) pentan-3-ol (tebuconazole), propiconazole, (RS)-2-(2,4-dichlorophenyl)-3-(1H-1,2,4-triazol-1-yl)propyl 1,1,2,2-tetrafluoroethyl ether (tetraconazole), (RS)-1-(4-chlorophenoxy)-3,3-dimethyl-1-(1H-1,2,4-triazol-1-yl) butan-2-one (triadimefon), (1RS,2RS; 1RS,2SR)-1-(4-chlorophenoxy)-3,3-dimethyl-1-(1H-1,2,4-triazol-1-yl) butan-2-ol (triadimenol), (RS)-(E)-5-(4-chlorobenzylidene)-2,2-dimethyl-1-(1H-1,2,4-triazol-1-ylmethyl)cyclopentanol (triticonazole), (E)-(RS)-1-(4-chlorophenyl)-4,4-dimethyl-2-(1H-1,2,4-triazol-1-yl)pent-1-en-3-ol (uniconazole), (E)-(S)-1-(4-chlorophenyl)-4,4-dimethyl-2-(1H-1,2,4-triazol-1-yl)pent-1-en-3-ol (uniconazole-P), 2-(2,4-difluorophenyl)-1-(1H-1,2,4-triazole-1-yl)-3-trimethylsilyl-2-propanol, or a combination thereof. Other azole compounds suitable as an additional biocide can comprise amisulbrom, bitertanol, fluotrimazole, triazbutil, climbazole, clotrimazole, imazalil, oxpoconazole, prochloraz, triflumizole, azaconazole, simeconazole, hexaconazole, or a combination thereof.

The pyrazole can comprise: benzovindiflupyr, bixafen, fenpyrazamine, fluxapyroxad, furametpyr, isopyrazam, oxathiapiprolin, penflufen, penthiopyrad, pydiflumetofen, pyraclostrobin, pyrametostrobin, pyraoxystrobin, rabenzazole, sedaxane, or a combination thereof.

The boron compound can comprise water-insoluble boron compounds, such as, for example, metal borate compounds (e.g., calcium borate, borate silicate, aluminum silicate borate hydroxide, silicate borate hydroxide fluoride, hydroxide silicate borate, sodium silicate borate, calcium silicate borate, aluminum borate, boron oxide, magnesium borate, iron borate, copper borate, and zinc borate (borax)).

The quaternary ammonium can comprise didecyldimethylammonium chloride; didecyldimethylammonium carbonate/bicarbonate; alkyldimethylbenzylammonium chloride; alkyldimethylbenzylammonium carbonate/bicarbonate; didodecyldimethylammonium chloride; didodecyldimethylammonium carbonate/bicarbonate; didodecyldimethylammonium propionate; N,N-didecyl-N-methyl-poly(oxyethyl) ammonium propionate, or a combination thereof.

The isothiazolone can comprise methylisothiazolinone; 5-chloro-2-methyl-4-isothiazoline-3-one, 2-methyl-4-isothiazoline-3-one, 2-n-octyl-4-isothiazoline-3-one, 4,5-dichloro-2-n-octyl-4-isothiazoline-3-one, 2-ethyl-4-isothiazoline-3-one, 4,5-dichloro-2-cyclohexyl-4-isothiazoline-3-one, 5-chloro-2-ethyl-4-isothiazoline-3-one, 2-octyl-3-isothiazolone, 5-chioro-2-t-octyl-4-isothiazoline-3-one, 1,2-benzisothiazoline-3-one, preferably 5-chloro-2-methyl-4-isothiazoline-3-one, 2-methyl-4-isothiazoline-3-one, 2-n-octyl-4-isothiazoline-3-one, 4,5-dichloro-2-n-octyl-4-isothiazoline-3-one, 1,2-benzisothiazoline-3-one, etc., more preferably 5-chloro-2-methyl-4-isothiazoline-3-one, 2-n-octyl-4-isothiazoline-3-one, 4,5-dichloro-2-n-octyl-4-isothiazoline-3-one, 1,2-benzisothiazoline-3-one, chloromethylisothiazolinone, 4,5-Dichloro-2-n-octyl-3(2H)-isothiazolone, 1,2-benzisothiazolin-3-one, or a combination thereof.

The pyrethroid can comprise: acrinathrin, allethrin, bioallethrin, barthrin, bifenthrin, bioethanomethrin, cyclethrin, cycloprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltamethrin, dimefluthrin, dimethrin, empenthrin, fenfluthrin, fenpirithrin, fenpropathrin, fenvalerate, esfenvalerate, flucythrinate, fluvalinate, tau-fluvalinate, furethrin, imiprothrin, metofluthrin, permethrin, biopermethrin, transpermethrin, phenothrin, prallethrin, profluthrin, pyresmethrin, resmethrin, bioresmethrin, cismethrin, tefluthrin, terallethrin, tetramethrin, tralomethrin, transfluthrin, etofenprox, flufenprox, halfenprox, protrifenbute, silafluofen, or a combination thereof.

The additional biocide can comprise imidachloprid, fipronil, cyfluthrin, bifenthrin, permethrin, cypermethrin, chlorpyrifos, iodopropynyl butylcarbamate (IPBC), chlorothalonil, 2-(thiocyanatomethylthio) benzothiazole, alkoxylated diamines, carbendazim, or a combination thereof. The additional biocide can comprise a bactericide, a moldicide, or a combination thereof.

The wood preservative composition can comprise a flash point suitable for handling and/or a desirable treatment application. For example, the wood preservative composition can comprise a flash point of at least 20 degrees Celsius, such as, for example, at least 30 degrees Celsius, at least 40 degrees Celsius, at least 50 degrees Celsius, at least 60 degrees Celsius, at least 70 degrees Celsius, at least 80 degrees Celsius, at least 100 degrees Celsius, at least 110 degrees Celsius, at least 120 degrees Celsius, at least 130 degrees Celsius, or at least 140 degrees Celsius.

The present disclosure also provides a method for making the wood preservative composition. The method can comprise dissolving the DCOI and the polymeric resin in the organic solvent, thereby forming the wood preservative composition. In various examples, a de-emulsifier may be added to the organic solvent and/or other component (e.g., a colorant, an ultraviolet stabilizer, a de-foamer, a water repellent, an additional biocide, a fungicide, a termiticide, a fire retardant or a combination thereof). In various examples, the wood preservative composition according to the present disclosure is made by dissolving the DCOI in the organic solvent, thereby forming an intermediate mixture followed by mixing the intermediate mixture with the polymeric resin and the de-emulsifier.

The wood preservative composition according to the present disclosure can be formulated as a concentrated composition (e.g., greater than 5% by weight DCOI based on the total weight of the composition) or a diluted composition (e.g., ready to treat formulation, 0.5% by weight to 5% by weight DCOI based on the total weight of the composition). For example, if the wood preservative composition according to the present disclosure is formulated as a concentration composition, the concentration composition can be diluted with another organic solvent, which may be the same or different than the organic solvent used to formulate the concentrated composition, prior to treating a wood substrate with the wood preservative composition. In certain examples, the concentrated formulation may be formed by mixing the DCOI with a retaining additive (with or without the presence of an organic solvent) at a temperature above the melting point of DCOI. The resulting concentrate can be in a liquid form or a solid form. In addition, the resulting concentrate can be further diluted in an organic solvent to make the final wood preservative treating composition. In certain examples, the concentrated formulation may be used to treat a wood substrate to form a wood product.

The concentrated composition can comprise at least 5% by weight DCOI based on the total weight of the composition, such as, for example, at least 10% by weight DCOI, at least 15% by weight DCOI, at least 20% by weight DCOI, at least 30% by weight DCOI, at least 40% by weight DCOI, or at least 50% by weight DCOI, all based on the total weight of the composition. The concentrated composition can comprise no greater than 80% by weight DCOI based on the total weight of the composition, such as, for example, no greater than 70% by weight DCOI, no greater than 60% by weight DCOI, or no greater than 50% by weight DCOI, all based on the total weight of the composition. In various examples, the concentration composition can comprise DCOI in a range of 5% to 80% by weight based on the total weight of the composition, such as, for example, 20% to 80% by weight, 30% to 70% by weight, 40% to 50% by weight, or 45% to 55% by weight.

The concentrated composition can comprise at least 5% by weight of the retaining additive based on the total weight of the composition, such as, for example, at least 10% by weight retaining additive, at least 20% by weight retaining additive, at least 30% by weight retaining additive, at least 40% by weight retaining additive, or at least 50% by weight retaining additive, all based on the total weight of the composition. The concentrated composition can comprise no greater than 80% by weight retaining additive based on the total weight of the composition, such as, for example, no greater than 70% by weight retaining additive, no greater than 60% by weight retaining additive, or no greater than 50% by weight retaining additive, all based on the total weight of the composition. In various examples, the concentration composition can comprise retaining additive in a range of 5% to 80% by weight based on the total weight of the composition, such as, for example, 20% to 80% by weight, 30% to 70% by weight, 40% to 50% by weight, or 45% to 55% by weight, all based on the total weight of the composition. In certain examples where the retaining additive comprises a wax, the concentrated composition can be solid at 20 degrees Celsius. In various examples, the concentrated composition and/or the treating composition can be liquid at 20 degrees Celsius.

The present disclosure also provides a method of treating a wood substrate, thereby forming a wood product. The method comprises contacting a wood substrate with the wood preservative composition according to the present disclosure for a period of time suitable to inhibit fungal decay of the wood substrate. The method of treating the wood substrate can inhibit biological deterioration (e.g., fungal decay) and insect attack of the wood product (e.g., termite attack). The contacting can be performed until the wood product retains at least 0.05 pounds of DCOI per cubic foot (pcf) of the wood product, such as, for example, at least 0.10 pounds of DCOI pcf of the wood product or at least 0.15 pounds of DCOI pcf of the wood product.

Contacting the wood substrate can comprise dipping, soaking, spraying, brushing, a vacuum process, a pressure process, or a microwave process. For example, the contacting can comprise a modified full-cell process, an empty-cell process, or a combination thereof. In various examples, contacting comprises the empty-cell process and the empty-cell process comprises a Rueping process and a Lowry process. For example, in the empty-cell process, prior to the introduction of wood preservative composition according to the present disclosure, the wood substrate is subjected to atmospheric air pressure (Lowry) or to higher air pressures than atmospheric (Rueping) of the necessary intensity and duration. Various example contacting processes that can be used with the present disclosure are defined in the American Wood Protection Association (AWPA) Book of Standards T1-21: Processing and Treatment Standard, which is hereby incorporated by reference.

The present disclosure also provides a wood product produced by treating a wood substrate with the wood preservative composition according to the present disclosure. The wood product can comprise timber, plywood, laminated veneer lumber (LVL), cross laminated timber (CTL), parallel strand lumber (PSL), structural glued laminated timber, particle board, dimensional lumber, or a combination thereof. In various examples, the wood product comprises a deck, a rail, a fence, a utility pole, a pile, a railway tie, a railroad bridge, cladding, siding, or a combination thereof. For example, the wood product can comprise a utility pole.

The wood product can comprise various species of wood. For example, the wood product can comprise southern pine, Douglas fir, Jack pine, red pine, Lodgepole pine, radiata pine, Alaska yellow cedar, Hem-fir, Nordic pine, Scotts pine, white spruce, Spruce-Pine-Fir, redwood, white oak, red oak, maple, black and red gum, Norway spruce, Sitka spruce, western red cedar, western larch, ponderosa pine, or a combination thereof.

In various examples, by treating the wood product with the wood preservative composition according to the present disclosure, the wood product may leach less DCOI into deionized water after 24 hours than a comparative wood product treated with a comparative composition without the retaining additive (i.e., the same components except the retaining additive is replaced with addition organic solvent). For example, the wood product can leach at least 5% less DCOI into deionized water after 24 hours than a comparative wood product treated with a comparative composition without the retaining additive, such as, for example, at least 10% less, at least 15% less, at least 20% less, at least 25% less, at least 30% less, at least 40% less, at least 50% less, at least 60% less, at least 75% less, at least 80% less, or at least 90% less DCOI into deionized water after 24 hours than a comparative wood product treated with a comparative composition without the retaining additive. In certain examples, the wood preservation composition can be adjusted to have enhanced DCOI leach resistance without the use of the retaining additive.

In various examples, by treating the wood product with the wood preservative composition according to the present disclosure, less DCOI may be dislodged from a surface of the wood product after 72 hours as measured by wiping with a polyester wipe 9 times across the surface of the wood product than a comparative wood product treated with a comparative composition without the retaining additive. For example, the wood product can dislodge at least 5% less DCOI from a surface of the wood product after 72 hours as measured by wiping with a polyester wipe 9 times across the surface of the wood product than a comparative wood product treated with a comparative composition without the retaining additive, such as, for example, at least 10% less, at least 15% less, at least 20% less, at least 25% less, at least 30% less, at least 40% less, at least 50% less, at least 60% less, at least 75% less, at least 80% less, or at least 90% less DCOI into deionized water after 24 hours than a comparative wood product treated with a comparative composition without the retaining additive. In certain examples, the wood preservation composition can be adjusted to have enhanced DCOI dislodgeability resistance without the use of the retaining additive.

EXAMPLES

The present disclosure will be more fully understood by reference to the following examples, which provide illustrative non-limiting aspects of the invention. It is understood that the invention described in this specification is not necessarily limited to the examples described in this section.
Retaining Additive and Organic Solvent Compatibility Testing For testing the compatibility of the organic solvent and the retaining additive at a 1% by weight concentration, 0.1 gram of the retaining additive and 9.9 grams of the organic solvent can be added to a 20 mL clear glass vial and mixed together. Thereafter, the vial is stored at a selected temperature (i.e., ambient temperature or 40 degrees Fahrenheit in a refrigerator). The vial is monitored for up to 7 days for phase separation and precipitation which may indicate incompatibility between the organic solvent and the retaining additive.

By way of example, various retaining additives were tested for compatibility with #2 diesel at 1% by weight according to the method described above and the results are shown in Table 1 below. A retaining additive was determine to be compatible if there was no observable phase separation or precipitation after 7 days of storage at ambient temperature and 40 degrees Fahrenheit.

TABLE 1

Retaining additive Compatibility with #2 Diesel

| Trade Name of Retaining additive | General Composition | Supplier | Compatibility (wt. 1%) |
|---|---|---|---|
| Chempol 801-2164 | Alkyd Resin | Arkema | Yes |
| Chempol 801-6005 | Alkyd Resin | Arkema | Yes |
| Chempol 801-7961 | Alkyd Resin | Arkema | Yes |
| Paraffin Wax | Wax | Aldrich | Yes |
| Slack Wax | Wax | Aldrich | Yes |
| Piccotac ™ 8095 | Hydrocarbon Resin | Eastman | Yes |
| Piccotac ™ 1095 | Hydrocarbon Resin | Eastman | Yes |
| CAB 381-0.1 | Cellulose Ester Resin | Eastman | No |
| CAB 551-0.2 | Cellulose Ester Resin | Eastman | No |
| Desmodur XP2675 | Polyisocyanate Resin | Covestro | No |
| Desmodur N3900 | Polyisocyanate Resin | Covestro | No |
| Desmodur N3400 | Polyisocyanate Resin | Covestro | No |
| Pearlstick 5714 | Polyurethane Resin | Lubrizol | No |
| Pearlstick 5703 | Polyurethane Resin | Lubrizol | No |
| Pearlstick 5701 | Polyurethane Resin | Lubrizol | No |
| Setalux 27-1550 | Acrylic Resin | Allnex | No |
| Setalux 1190 SS-61 | Acrylic Resin | Allnex | No |
| Duroxyn EF900/60X | Epoxy Resin | Allnex | No |
| Duroxyn EF935/60X | Epoxy Resin | Allnex | No |
| Sancure ™ 1511 | Polyester Resin | Lubrizol | No |

During the testing it was observed that Chempol 801 alkyd resin, Paraffin wax, Slack wax and Piccotac hydrocarbon resin were compatible with #2 diesel at 1% by weight. Without being bound by any particular theory, it is believed that the compatibility of the retaining additive with #2 diesel is based on the solubility of the respective retaining additive in #2 diesel. Therefore, various combinations of retaining additives and organic solvents can be selected for use with the wood preservative composition according to the present disclosure by utilizing the compatibility test described herein.

Organic Solvent Solvency with DCOI and Retaining Additive Testing

For testing the solvency (i.e., ability to dissolve) of the organic solvent for DCOI and the retaining additive, 4.7 gram of DCOI and 5.0 g of retaining additive were dissolved in 10.3 gram of organic solvent to make a 23.5% of DCOI and 25.0% resin solution in a clear 20 ml glass vial. Thereafter, the vial is stored at a selected temperature (i.e., ambient temperature, 40 degrees Fahrenheit, or 120 degree Fahrenheit or whenever a crosslinking may occur). The vial is monitored for up to 7 days for phase separation, precipitation, and turbidity, which may indicate incompatibility between the organic solvent and the retaining additive and/or DCOI. The as prepared solution is maintained at room temperature and 40 degrees Fahrenheit for up to 7 days or whenever a phase separation, precipitation or solution turbidity event happens to disqualify the solution.

The results of the solvency test of various organic solvents with DCOI and Chempol 801-2164 are shown in Table 2 below. The solvents were tested at 40 degrees Fahrenheit and rated low solvency, medium solvency, or high solvency based on the amount, if any, of separation, precipitation, and turbidity observed in each solution.

TABLE 2

Solvency of DCOI/retaining additive in Organic Solvents

| Solvent | CAS# | Flash Point (° C.) | DCOI/Resin Solvency |
|---|---|---|---|
| Exxsol D 40 | 64742-47-8 | 44 | Medium |
| Exxsol D 60 | 64742-47-8 | 64 | Medium |
| Exxsol D 80 | 64742-47-8 | 83 | Medium |
| Exxsol D 95 | 64742-47-8 | 96 | Medium |
| Exxsol D 110 | 64742-47-8 | 115 | Medium |
| Exxsol D 130 | 64742-46-7 | 137 | Low |
| Varsol 1 | 8052-41-3 | 45 | Medium |
| Varsol 18 | 8052-41-3 | 44 | Medium |
| Varsol 60 | 64742-82-1 | 65 | Medium |
| Varsol 80 | 64742-81-0 | 80 | Medium |
| Varsol 110 | 64742-81-0 | 116 | Medium |
| Varsol 120 | 64742-81-0 | 120 | Medium |
| Varsol 140 | 64742-80-9 | 66 | Low |
| Varsol 140 naphtha | 64742-47-8 | 65 | Medium |
| Aromatic 100 | 64742-95-6 | 46 | High |
| Aromatic 150 | 64742-94-5 | 65 | High |
| Aromatic 150 ND | 64742-94-5 | 64 | High |
| Aromatic 200 | 64742-94-5 | 107 | High |
| Aromatic 200 ND | 64742-94-5 | 111 | High |
| Diesel # 2 | 68476-34-6 | 58-76 | High |
| Benzyl Alcohol | 100-51-6 | 93 | High |
| Biodiesel | 67762-38-3 67784-80-9 68937-84-8 61788-61-2 67762-26-9 73891-99-3 129828-16-6 67762-26-9 | >=93 | High |

Based on the results above, Aromatic 100, Aromatic 150, Aromatic 150 ND, Aromatic 200, Aromtic 200ND, diesel fuel #2, and benzyl alcohol were determined to be good candidates for further performance testing. It is believed other solvents are also suitable and that the solvents that did not perform well in this test may be suitable with other retaining additives and/or additional components to improve the solubility of the retaining additive.

Preparation of a Concentrated Wood Preservative Composition

To prepare a concentrated wood preservative composition, 200 grams of wood preservative concentrate is prepared by adding 103 grams of organic solvent, 47 grams of DCOI, and 50 gram of retaining additive under agitation to a 200 mL beaker until a homogenous solution is formed. The beaker can be placed in a 40° C. water bath to speed up the dissolving process.

Preparation of a Diluted Wood Preservative Composition 5 kilogram of a diluted wood preservative composition is prepared by adding 4500 grams of an additional organic solvent, #2 diesel, and 500 grams of the concentrated wood preservative composition under agitation to a 5-liter beaker until a homogenous solution is formed.

De-Emulsifier Evaluation

To evaluate the effectiveness of a de-emulsifier, de-emulsifier was added to 20 ml of diluted wood preservative composition in a glass vial to achieve a concentration of 1000 ppm and mixed thoroughly. Thereafter, 5 ml of water is added into the glass vial and a line at the water/oil interface is marked with a marker. Then the vial is mix for 10 seconds using a vortex mixer. After mixing, the vial is placed on a countertop and observed over time to determine how long it takes the water to completely separate from the wood preservative composition based on the previously marked line.

Various de-emulsifiers were tested with a wood preservative composition comprising 2.3% by weight DCOI, 2.5% by weight of Chempol 801-2164, and Aromatic 200 ND according to the procedures described above. The results of the de-emulsifier testing is shown in Table 3 below:

TABLE 3

Evaluation of De-emulsifiers at 1000 ppm in the Wood Preservative Composition

| De-emulsifier | Observations |
|---|---|
| Foam Ban HV-830G | Starts getting water separation at 2.5 minutes. Water is very hazy. No change at 5 minutes. |
| Foam Ban HV-810G | Starts getting water separation that is clear after 30 s. Most of the water has separated out after 1 minute. |
| Foam Ban 1839 | Starts getting water separation at 45 s. Rapid separation but water is hazy. Water layer clears up over 2 days. |
| Foam Ban 820-N | Starts getting some separation at 30 s. About 90% of water has separated out after 1 minute. Water is clear. |
| Tego Foamex 843 | No Separation |

TABLE 3-continued

Evaluation of De-emulsifiers at 1000 ppm in the Wood Preservative Composition

| De-emulsifier | Observations |
|---|---|
| Tego Foamex 883 | No Separation |
| Surfynol 420 | Starts getting water separation after 1.5 minutes. Close to 70% of water has separated out by 5 minutes. 95% of water has separated out by 6.5 minutes. |
| Emulsogen EL 360A | Starts getting water separation after 2 minutes. Close to 50% of water has separated out by 5 minutes. 90% of water has separated out by 6.5 minutes. |
| Foam Ban WP-35 | Has a good layer of separation by 15 s. 90% has separated by 1 minute |
| Foam Ban MS-550 | Does not mix with the Diesel phase. Most of the water has separated out by 30 seconds but is hazy. Water is still hazy after 5 minutes. Water layer is still hazy after sitting over 2 days. |

As shown in Table 3, many de-emulsifiers are likely suitable for further performance testing in a wood preservative composition. It is believed other emulsifiers are also suitable for use with diesel #2 and that the performance of the de-emulsifier can change based on the organic solvent used.

Various diluted wood preservative compositions were prepared from concentrated wood preservative compositions as shown in Table 4 below. The organic solvent used in Table 4 is a mixture of Aromatic 200 and diesel 2.

TABLE 4

Various diluted wood preservative compositions

| Sample | DCOI (% by weight) | Retaining additive Name | Retaining additive (% by weight) | Aromatic 200 (% by weight) | De-emulsifer Name | Demulsifer (% by weight) | Diesel #2 (% by weight) |
|---|---|---|---|---|---|---|---|
| #1 | 2.35 | Chempol 801-2164 | 2.50 | 5.13 | Surfynol 420 | 0.1 | 89.92 |
| #2 | 2.35 | Chempol 801-2164 | 2.50 | 5.13 | Foam Ban WP35 | 0.1 | 89.92 |
| #3 | 2.35 | Chempol 801-2164 | 2.50 | 5.13 | Foam Ban 820-N | 0.1 | 89.92 |
| #4 | 2.35 | Chempol 801-7961 | 2.50 | 5.13 | Foam Ban WP35 | 0.1 | 89.92 |
| #5 | 2.35 | Chempol 801-7961 | 2.50 | 5.13 | Foam Ban 820-N | 0.1 | 89.92 |
| #6 | 2.35 | Piccotac ™ 8095 | 2.50 | 5.13 | Foam Ban WP35 | 0.1 | 89.92 |
| #7 | 2.35 | Piccotac ™ 8095 | 2.50 | 5.13 | Foam Ban 820-N | 0.1 | 89.92 |
| #8 | 2.35 | Piccotac ™ 1095 | 2.50 | 5.13 | Foam Ban WP35 | 0.1 | 89.92 |
| #9 | 2.35 | Piccotac ™ 1095 | 2.50 | 5.13 | Foam Ban 820-N | 0.1 | 89.92 |
| #10 | 2.35 | Slack Wax | 2.50 | 0 | Foam Ban WP35 | 0.1 | 95.05 |
| #11 | 2.35 | Slack Wax | 2.50 | 5.13 | Foam Ban 820-N | 0.1 | 89.92 |
| #12 (Comparative) | 2.35 | Not used | 0 | Not used | Not used | 0 | 97.65 |

Evaluation of Leaching of DCOI

To evaluate the leaching of DCOI from a wood substrate treated with samples #1-#12, SYP blocks were milled to cubes having dimensions of 0.75"×0.75"×0.75" with a ring count of 6-10 rings per inch were prepared. A set of cubes (minimum of 24) were used for test each sample #1-#12 and weighed individually before treating. To treat each set of cubes, the cubes were placed in a plastic container and weighed down with weights to prevent the cubes from floating. Then the container was placed in desiccator and subjected to a vacuum of −26" Hg for 20 minutes. The container was fill with one of the solution of one of samples #1-#12 under vacuum and the vacuum pump was turned off once all the cubes in the container were below the liquid level. The cubes were allowed to soak at atmospheric pressure for 30 minutes. After the 30 minutes had elapsed, the solution of the respective sample #1-#12 was removed and each cube in the container was weighed. This procedure was repeated until a set of cubes had been prepared for each of samples #1-#12.

The sets of cubes were then placed in oven at 120 degrees Fahrenheit and dried for 4 weeks. Once a week, four preselected cubes from each set of cubes were weighed. After the four weeks had passed, the sets of cubes were remove from the oven and allowed to sit at ambient temperature for 1 day.

From each set of cubes, 24 cubes with the most uniformed retention of the respective sample #1-#12 were selected for DCOI leach testing. Then, for each set, the 24 cubes were randomly divided into 4 groups of 6. Three of the groups were water impregnated while the fourth group was used to determine the unleached retention of DCOI.

For water impregnation of each group, the group was placed in a 16 oz glass jar and weighed down to prevent floating. 300 ml of deionized water was then added to the jars. The jars were placed into a cylinder without lids and subjected to a −26" Hg vacuum for 20 minutes. The vacuum was removed and the jars were sealed for the leaching testing.

For the leaching testing, each jar was placed on a shake table. The shake table was turned on and set to 100 RPMs. 300 mL aliquots of the water solution from each jar were taken at selected intervals and replaced with an additional 300 ml of deionized water. Each aliquot taken was analyzed for DCOI content. The jars were observed for a minimum of 14 days. A summary of the results of the leaching testing are provided in Table 5 below:

TABLE 5

DCOI Leaching Results
DCOI in water (ppm)

| Sample | 6 h | 1 d | 2 d | 4 d | 7 d | 14 d | In total |
|---|---|---|---|---|---|---|---|
| #2 | 0.066 | 0.026 | 0.018 | 0.012 | 0.008 | 0 | 0.130 |
| #10 | 0.089 | 0.033 | 0.031 | 0.016 | 0.009 | 0 | 0.178 |
| #12 | 0.159 | 0.039 | 0.032 | 0.013 | 0.008 | 0.002 | 0.253 |

As shown in Table 5 above, Samples #2 and #10 had an improved leach rate of DCOI into the deionized water than comparative sample #12 indicating the respective retaining additive inhibited the release of DCOI into the deionized water.

Wood Treatment

Samples #1-#12 were used to treat wood substrates. The wood substrates were 3"×10" prepared from select 1 SYP 5/4" thick deck board with no defects. To treat each wood substrate to create a wood product, a cylinder was filled with 5 kg with one of samples #1-12 #. Thereafter, the wood substrate was added and subjected to a treatment cycle of 15 minutes at −26" Hg initial vacuum, 30 minutes at 100 psi pressure, and 15 minutes at −26" Hg final vacuum.

Evaluation of Surface Dislodgeability of DCOI

After treatment, boards were placed in a 120° F. oven and dried for 41 days, and after removal were left at ambient temperature for 11 additional days.

After conditioning, the boards were cut into 3 pieces with dimensions of 3"×35/16"×1". Polyester wipes were cut to a dimension of 3"×4" and attached to a 27/8"×27/8"×1" steel block using tape. A piece of parafilm was placed between the wipe and the block and was changed every wipe to prevent cross contamination. Each sample board was placed in a holder and wiped 9 times across a surface of the sample board using only gravity for down pressure. Thereafter, the wipe was placed in a large centrifuge tube and 30 g of Methanol was added and analyzed for DCOI content.

An initial wipe was performed on each board. Then each sample board was placed in a QUV chamber and wiped at day 3 and then every 7 days after that. In the QUV chamber, each board was subjected to a repeating cycle of 2.5 hrs of UV exposure followed by a 0.5 hr water spray. This cycle repeated until the testing was completed.

TABLE 6

Dislodgeability of DCOI

DCOI dislodged from the surface (ppm)

| Sample | 0 d | 3 d | 9 d | 23 d | 33 d | In total |
|---|---|---|---|---|---|---|
| #2 | 0.131 | 0.042 | 0.033 | 0.01 | 0.009 | 0.225 |
| #12 | 0.198 | 0.079 | 0.012 | 0.004 | 0.021 | 0.314 |

As observed from Table 6 above, a wood substrate treated with sample #2 showed less DCOI surface dislodging after 33 days compared to DCOI alone.

It is believed that other wood preservative compositions according to the present disclosure can also retain more DCOI in the wood product than comparative wood preservative compositions.

DCOI Concentrate Example 1

DCOI concentrate was made by dissolving 46.70 g of DCOI and 71.0 g of Chempol 801-2164 in a mixture of 46.14 g of Benzyl alcohol and 46.16 g of #2 diesel in a 200 mL beaker under agitation. The mixture was agitated for 20 minutes or until a homogenous solution was formed. DCOI concentrate Example 1 had a suitable viscosity of 132.4 cP at 25° C.

DCOI Concentrate Example 2

DCOI concentrate was made by dissolving 46.70 g of DCOI and 71.0 g of Chempol 801-6005 in a mixture of 46.14 g of Benzyl alcohol and 46.16 g of #2 diesel in a 200 mL beaker under agitation. The mixture was agitated for 20 minutes or until a homogenous solution was formed. DCOI concentrate Example 2 had a suitable viscosity of 156.3 cP at 25° C.

DCOI Concentrate Example 3

DCOI concentrate was made by dissolving 46.70 g of DCOI and 71.0 g of Chempol 801-7961 in a mixture of 46.14 g of Benzyl alcohol and 46.16 g of #2 diesel in a 200 mL beaker under agitation. The mixture was agitated for 20 minutes or until a homogenous solution was formed. DCOI concentrate Example 3 had a suitable viscosity of 156.3 cP at 25° C.

DCOI Concentrate Example 4

DCOI concentrate was made by dissolving 46.70 g of DCOI and 71.0 g of Piccotac™ 8095 in a mixture of 46.14 g of Benzyl alcohol and 46.16 g of #2 diesel in a 200 mL beaker under agitation. The mixture was agitated for 20 minutes or until a homogenous solution was formed. DCOI concentrate Example 4 had a suitable viscosity of 187.3 cP at 25° C.

DCOI Concentrate Example 5

DCOI concentrate was made by dissolving 46.70 g of DCOI and 71.0 g of Piccotac™ 8015 in a mixture of 46.14 g of Benzyl alcohol and 46.16 g of #2 diesel in a 200 mL beaker under agitation. The mixture was agitated for 20 minutes or until a homogenous solution was formed. DCOI concentrate Example 5 had a suitable viscosity of 230.6 cP at 25° C.

DCOI Concentrate Example 6

DCOI concentrate was made by dissolving 46.70 g of DCOI and 71.0 g of Setal 21-3464 in a mixture of 46.14 g of Benzyl alcohol and 46.16 g of #2 diesel in a 200 mL beaker under agitation. The mixture was agitated for 20 minutes or until a homogenous solution was formed. DCOI concentrate Example 6 had a suitable viscosity of 36.4 cP at 25° C.

DCOI Concentrate Example 7

DCOI concentrate was made by dissolving 46.70 g of DCOI and 71.0 g of Setal 11-3610 in a mixture of 46.14 g of Benzyl alcohol and 46.16 g of #2 diesel in a 200 mL beaker under agitation. The mixture was agitated for 20 minutes or until a homogenous solution was formed. DCOI concentrate Example 7 had a suitable viscosity of 28.3 cP at 25° C.

DCOI Concentrate Example 8

DCOI concentrate was made by dissolving 46.70 g of DCOI and 71.0 g of Setal 11-3466 in a mixture of 46.14 g of Benzyl alcohol and 46.16 g of #2 diesel in a 200 mL beaker under agitation. The mixture was agitated for 20 minutes or until a homogenous solution was formed. DCOI concentrate Example 8 had a suitable viscosity of 12.5 cP at 25° C.

DCOI Concentrate Example 9

A DCOI concentrate was made by heating 98.48 g of a slack wax (melting point 30-68 degrees Celsius) at 40 degrees Celsius in a 200 mL beaker. Then, 101.52 g of DCOI (98.5% purity) was added into the beaker to form an intermediate mixture while continuously mixing and heating the intermediate mixture to 45 degrees Celsius. The as prepared solution was allowed to naturally cool down to below 35 degrees Celsius to form a solid block. DCOI concentrate Example 9 had a suitable initial viscosity of less than 10 cP at 40° C.

DCOI Concentrate Example 10

A DCOI concentrate was made by heating 98.48 g of a slack wax (melting point 42 degrees Celsius) at 45 degrees Celsius in a 200 mL beaker. Then, 101.52 g of DCOI (98.5% purity) was added into the beaker to form an intermediate mixture while continuously mixing and heating the intermediate mixture to 45 degrees Celsius. The mixture was agitated for 20 minutes or until a homogenous solution was formed. The as prepared solution was allowed to naturally cool down to below 35 degrees Celsius to form a solid block. DCOI concentrate Example 10 had a suitable initial viscosity of less than 10 cP at 45° C.

DCOI Concentrate Example 11

A DCOI concentrate was made by heating 98.48 g of a slack wax (melting point 48-52 degrees Celsius) at 55 degrees Celsius in a 200 mL beaker. Then, 101.52 g of DCOI (98.5% purity) was added into the beaker to form an intermediate mixture while continuously mixing and heating the intermediate mixture to 55 degrees Celsius. The mixture was agitated for 20 minutes or until a homogenous solution was formed. The as prepared solution was allowed to naturally cool down to below 35 degrees Celsius to form a solid block. DCOI concentrate Example 11 had a suitable initial viscosity of less than 10 cP at 55° C.

DCOI Concentrate Example 12

A DCOI concentrate was made by heating 98.48 g of a slack wax (melting point 47-49 degrees Celsius) at 55 degrees Celsius in a 200 mL beaker. Then, 101.52 g of DCOI (98.5% purity) was added into the beaker to form an intermediate mixture while continuously mixing and heating the intermediate mixture to 55 degrees Celsius. The mixture was agitated for 20 minutes or until a homogenous solution was formed. The as prepared solution was allowed to naturally cool down to below 35 degrees Celsius to form a solid block. DCOI concentrate Example 12 had a suitable initial viscosity of less than 10 cP at 55° C.

DCOI Concentrate Example 13

A DCOI concentrate was made by heating 98.48 g of a slack wax (melting point 53 degrees Celsius) at 58 degrees Celsius in a 200 mL beaker. Then, 101.52 g of DCOI (98.5% purity) was added into the beaker to form an intermediate mixture while continuously mixing and heating the intermediate mixture to 58 degrees Celsius. The mixture was agitated for 20 minutes or until a homogenous solution was formed. The as prepared solution was allowed to naturally cool down to below 35 degrees Celsius to form a solid block. DCOI concentrate Example 13 had a suitable initial viscosity of less than 10 cP at 58° C.

DCOI Concentrate Example 14

A DCOI concentrate was made by heating 98.48 g of a paraffin wax (melting point 54 degrees Celsius) at 59 degrees Celsius in a 200 mL beaker. Then, 101.52 g of DCOI (98.5% purity) was added into the beaker to form an intermediate mixture while continuously mixing and heating the intermediate mixture to 59 degrees Celsius. The mixture was agitated for 20 minutes or until a homogenous solution was formed. The as prepared solution was allowed to naturally cool down to below 35 degrees Celsius to form a solid block. DCOI concentrate Example 14 had a suitable initial viscosity of less than 10 cP at 59° C.

DCOI Concentrate Example 15

A DCOI concentrate was made by heating 98.48 g of a paraffin wax (melting point 51 degrees Celsius) at 56 degrees Celsius in the a 200 mL beaker. Then, 101.52 g of DCOI (98.5% purity) was added into the beaker to form an intermediate mixture while continuously mixing and heating the intermediate mixture to 56 degrees Celsius. The mixture was agitated for 20 minutes or until a homogenous solution was formed. The as prepared solution was naturally cool down to below 35 degrees Celsius to form a solid block. DCOI concentrate Example 15 had a suitable initial viscosity of less than 10 cP at 56° C.

DCOI Concentrate 16

A DCOI concentrate was made by heating 98.48 g of a paraffin wax (melting point 59 degrees Celsius) at 64 degrees Celsius in a 200 mL beaker. Then, 101.52 g of DCOI (98.5% purity) was added into the beaker to form an intermediate mixture while continuously mixing and heating the intermediate mixture to 64 degrees Celsius. The mixture was agitated for 20 minutes or until a homogenous solution was formed. The as prepared solution was allowed to naturally cool down to below 35 degrees Celsius to form a solid block. DCOI concentrate Example 16 had a suitable initial viscosity of less than 10 cP at 64° C.

DCOI Concentrate Example 17

DCOI concentrate was made by heating 98.48 g of a paraffin wax (melting point 61 degrees Celsius) at 66 degrees Celsius in a 200 mL beaker. Then, 101.52 g of DCOI (98.5% purity) was added into the beaker to form an intermediate mixture while continuously mixing and heating the intermediate mixture to 66 degrees Celsius. The mixture was agitated for 20 minutes or until a homogenous solution was formed. The as prepared solution was allowed to naturally cool down to below 35 degrees Celsius to form a solid block. DCOI concentrate Example 17 had a suitable initial viscosity of less than 10 cP at 66° C.

DCOI Concentrate Example 18

DCOI concentrate was made by heating 98.48 g of a paraffin wax (melting point 66 degrees Celsius) at 71 degrees Celsius in a 200 mL beaker. Then, 101.52 g of DCOI (98.5% purity) was added into the beaker to form an intermediate mixture while continuously mixing and heating the intermediate mixture to 71 degrees Celsius. The mixture was agitated for 20 minutes or until a homogenous solution was formed. The as prepared solution was allowed to naturally cool down to below 35 degrees Celsius to form a solid block. DCOI concentrate Example 18 had a suitable initial viscosity of less than 10 cP at 71° C.

DCOI Concentrate Example 19

DCOI concentrate block was made by heating 98.48 g of a microcrystalline wax (melting point 90 degrees Celsius) at 100 degrees Celsius in a 200 mL beaker. Then, 101.52 g of DCOI (98.5% purity) was added into the beaker to form an intermediate mixture while continuously mixing and heating the intermediate mixture to 100 degrees Celsius. The mixture was agitated for 20 minutes or until a homogenous solution was formed. The as prepared solution was allowed to naturally cool down to below 35 degrees Celsius to form a solid block. DCOI concentrate Example 19 had a suitable initial viscosity of less than 10 cP at 100° C.

DCOI Treating Solution Example 20

A treating solution of 2.3% of DCOI was made by adding 4500 g of #2 diesel to 500 g of DCOI concentrate Example 1 solution in a 5 liter plastic beaker under agitation until a homogeneous solution was formed. DCOI Treating Solution Example 20 had a viscosity of less than 3 cP at 25° C.

DCOI Treating Solution Example 21

A treating solution of 2.3% of DCOI was made by adding 4500 g of #2 diesel to 500 g of DCOI concentrate Example 6 solution in a 5 liter plastic beaker under agitation until a homogeneous solution was formed. DCOI Treating Solution Example 21 had a viscosity of less than 3 cP at 25° C.

DCOI Treating Solution Example 22

A treating solution of 2.3% of DCOI was made by adding 4500 g of #2 diesel to 500 g of DCOI concentrate Example 9 solution in a 5 liter plastic beaker under agitation until a homogeneous solution was formed. DCOI Treating Solution Example 22 had a viscosity of less than 3 cp at 25° C.

DCOI Treating Solution Example 23

A treating solution of 2.3% of DCOI was made by adding 4500 g of #2 diesel to 500 g of DCOI concentrate Example 14 solution in a 5 liter plastic beaker under agitation until a homogeneous solution is formed. DCOI Treating Solution Example 23 had a viscosity of less than 3 cp at 25° C.

DCOI Treating Solution Example 24

A treating solution of 2.3% of DCOI was made by adding 1295 g of biodiesel and 3205 g of #2 diesel to 500 g of DCOI concentrate Example 1 solution in a 5 liter plastic beaker under agitation until a homogeneous solution was formed. DCOI Treating Solution Example 24 had a viscosity of less than 3 cP at 25° C.

DCOI Treating Solution Example 25

A treating solution of 2.3% of DCOI was made by adding 1295 g of biodiesel and 3205 g of #2 diesel to 500 g of DCOI concentrate Example 6 solution in a 5 liter plastic beaker under agitation until a homogeneous solution was formed. DCOI Treating Solution Example 25 had a viscosity of less than 3 cP at 25° C.

DCOI Treating Solution Example 26

A treating solution of 2.3% of DCOI was made by adding 1295 g of biodiesel and 3205 g of #2 diesel to 500 g of DCOI concentrate Example 9 solution in a 5 liter plastic beaker under agitation until a homogeneous solution was formed. DCOI Treating Solution Example 26 had a viscosity of less than 3 cP at 25° C.

DCOI Treating Solution Example 27

A treating solution of 2.3% of DCOI was made by adding 1295 g of biodiesel and 3205 g of #2 diesel to 500 g of DCOI concentrate Example 14 solution in a 5 liter plastic beaker under agitation until a homogeneous solution was formed. DCOI Treating Solution Example 27 had a viscosity of less than 3 cP at 25° C.

In this specification, unless otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited.

The grammatical articles "a," "an," and "the," as used herein, are intended to include "at least one" or "one or more," unless otherwise indicated, even if "at least one" or "one or more" is expressly used in certain instances. Thus, the articles are used herein to refer to one or more than one (i.e., to "at least one") of the grammatical objects of the article. Further, the use of a singular noun includes the plural, and the use of a plural noun includes the singular, unless the context of the usage requires otherwise.

Any patent, publication, or other disclosure material identified herein is incorporated by reference into this specification in its entirety unless otherwise indicated, but only to the extent that the incorporated material does not conflict with existing descriptions, definitions, statements, or other disclosure material expressly set forth in this specification. As such, and to the extent necessary, the express disclosure as set forth in this specification supersedes any conflicting material incorporated by reference. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicants reserve the right to amend this specification to expressly recite any subject matter, or portion thereof, incorporated by reference herein.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

One skilled in the art will recognize that the herein-described components, devices, operations/actions, and objects, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class, and the non-inclusion of specific components, devices, operations/actions, and objects should not be taken limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:

1. A wood preservative composition comprising:
   1% by weight to 5% by weight of 4,5-dichloro-2-octyl-isothiazol-3-one (DCOI) based on a total weight of the wood preservative composition;
   0.5% by weight to 10% by weight of a retaining additive comprising a wax, wherein a weight ratio of the DCOI to the retaining additive is in a range of 1:4 to 4:1; and
   at least 80% by weight of an organic solvent, wherein the organic solvent comprises a flash point of at least 60 degrees Celsius.

2. The wood preservative composition of claim 1, wherein the wood preservative composition comprises 1% by weight to 10% by weight of the retaining additive.

3. The wood preservative composition of claim 1, wherein the wood preservative composition comprises 1.2% by weight to 5% by weight of the retaining additive.

4. The wood preservative composition of claim 1, wherein the retaining additive has a solubility in the organic solvent of at least 0.5% by weight.

5. The wood preservative composition of claim 1, wherein the retaining additive has a solubility in the organic solvent of at least 1% by weight.

6. The wood preservative composition of claim 1, wherein the wood preservative composition comprises 1.5% by weight to 5% by weight of the DCOI.

7. The wood preservative composition of claim 1, wherein the wood preservative composition comprises at least 90% by weight of an organic solvent.

8. The wood preservative composition of claim 1, wherein the organic solvent comprises a hydrocarbon solvent, an amine solvent, a glycol solvent, a ketone solvent, an ester solvent, an alcohol solvent, a halogenated solvent, a biodegradable organic solvent, or combinations thereof.

9. The wood preservative composition of claim 1, wherein the organic solvent comprises diesel, biodiesel, or a combination thereof.

10. The wood preservative composition of claim 1, wherein the weight ratio of the DCOI to the retaining additive is in a range of 1:1.5 to 1.5:1.

11. The wood preservative composition of claim 1, wherein the wax comprises an olefin wax, a petroleum wax, a carnauba wax, a polyethylene wax, a silicone wax, a polypropylene wax, a polytetrafluoroethylene (PTFE) synthetic wax, or a combination thereof.

12. The wood preservative composition of claim 1, wherein the wax comprises a melting point in a range of 40 degrees Celsius to 100 degrees Celsius.

13. The wood preservative composition of claim 1, wherein the organic solvent is liquid at room temperature.

14. A method of treating a wood substrate, the method comprising:
    contacting the wood substrate with the wood preservative composition of claim 1, for a period of time suitable to inhibit fungal decay of the wood substrate.

15. A wood product produced by the method of claim 14.

16. The wood product of claim 15, wherein the wood product retains at least 0.05 pounds of DCOI per cubic foot of the wood product.

17. The wood product of claim 15, wherein the wood product comprises a deck, a rail, a fence, a utility pole, a pile, a railway tie, a railroad bridge, cladding, siding, or a combination thereof.

18. A wood preservative composition consisting essentially of:
    1% by weight to 5% by weight of 4,5-dichloro-2-octyl-isothiazol-3-one (DCOI) based on a total weight of the wood preservative composition;
    1% by weight to 5% by weight of a retaining additive comprising a wax, wherein a weight ratio of the DCOI to the retaining additive is in a range of 1:1.5 to 1.5:1;
    at least 90% by weight of a hydrocarbon solvent, wherein the hydrocarbon solvent comprises a flash point of at least 60 degrees Celsius and wherein the retaining additive has a solubility in the hydrocarbon solvent of at least 1% by weight; and
    optionally a colorant, an ultraviolet (UV) stabilizer, a UV absorber, a de-foamer, a water repellent, an additional biocide, a fungicide, a termiticide, a fire retardant, or a combination.

19. A wood preservative composition consisting essentially of:
- 1% by weight to 5% by weight of 4,5-dichloro-2-octyl-isothiazol-3-one (DCOI) based on a total weight of the wood preservative composition;
- 1% by weight to 5% by weight of a retaining additive comprising a wax, wherein a weight ratio of the DCOI to the retaining additive is in a range of 1:1.5 to 1.5:1;
- at least 90% by weight of an organic solvent, wherein the organic solvent comprises diesel, biodiesel, or a combination thereof, and wherein the retaining additive has a solubility in the organic solvent of at least 1% by weight; and
- optionally a colorant, an ultraviolet (UV) stabilizer, a UV absorber, a de-foamer, a water repellent, an additional biocide, a fungicide, a termiticide, a fire retardant, or a combination.

20. A method of treating a wood substrate, the method comprising:
- contacting the wood substrate with the wood preservative composition of claim 19, for a period of time suitable to inhibit fungal decay of the wood substrate.

* * * * *